United States Patent [19]
Muhlrad

[11] 3,780,497
[45] Dec. 25, 1973

[54] ADSORPTION OF FLUORINE AND FLUORINE COMPOUNDS ON ALUMINA

[75] Inventor: Wolf Muhlrad, Chatou, France

[73] Assignee: Air Industrie, Courbevoie, France

[22] Filed: Aug. 20, 1971

[21] Appl. No.: 173,475

[30] Foreign Application Priority Data
May 28, 1971 France .............................. 71/19494

[52] U.S. Cl. ........................................ 55/71, 55/77
[51] Int. Cl. ............................................ B01d 53/06
[58] Field of Search ............... 55/71, 77, 79, 74, 55/274, 390; 423/240, 241, 483–485

[56] References Cited
UNITED STATES PATENTS

| | | | |
|---|---|---|---|
| 3,503,184 | 3/1970 | Knapp et al. ............................ | 55/71 |
| 3,485,014 | 12/1969 | Atsukawa et al. ....................... | 55/79 |
| 3,560,754 | 2/1971 | Kamentsky ............................ | 55/274 |

Primary Examiner—Charles N. Hart
Attorney—McDougall, Hersh & Scott

[57] ABSTRACT

The invention relates to a method for adsorbing gaseous fluorine on alumina particles.

The alumina particles are introduced at the base of an adsorption column through which the stream of gas to be scrubbed flows, the column terminating in a separator where the particles charged with fluorine are recovered. The method is particularly suitable for scrubbing of gas from electrolytic baths in an aluminium-producing plant.

10 Claims, 2 Drawing Figures

ADSORPTION OF FLUORINE AND FLUORINE COMPOUNDS ON ALUMINA

BACKGROUND OF THE INVENTION

1. Field of the Invention

This invention relates to a method for adsorbing fluorine on particles of alumina, the fluorine being in the elemental state or in the form of gaseous fluorine compounds (inter alia hydrofluoric acid), and for collecting any ultra-fine dust (more particularly fluorides) resulting for example from sublimation.

The invention relates more particularly, but not exclusively, to a method of the aforementioned kind of use in industrial aluminum-producing plant of the kind comprising electrolytic baths charged mainly with powdered alumina and fluorinated products which are usually cryolite (sodium aluminum fluoride) and aluminum fluoride.

2. Description of the Prior Art

While in operation, the aforementioned electrolytic baths produce fumes charged with fluorine compounds in gaseous form (inter alia hydrofluoric acid) or in the form of ultra-fine (usually sub-micronic) powder resulting from the sublimation of fluorinated products present in the charge treated in the electrolytic baths.

As is known, the aforementioned fumes charged with fluorine compounds are one of the most unpleasant sources of atmospheric pollution. It is practically essential nowadays to provide the aforementioned aluminum-producing plant with anti-pollution devices for collecting most of the fluorine compounds leaving the electrolytic baths in the aforementioned plants.

To this end it had already been proposed to take advantage, firstly, of the fact that the operation of an aluminum-producing installation comprising electrolytic baths implies the availability of reserves of fresh powdered alumina and, secondly, that powdered alumina, because of its porosity, can adsorb fluorinated compounds. It is thus possible to use powdered alumina which is to be supplied to the electrolytic baths for preliminary adsorption of gaseous fluorine compounds leaving the baths, which compounds it is desired to collect so as to avoid or at least mitigate atmospheric pollution.

It should be noted that the adsorption of the fluorine compounds on powdered alumina which is to be supplied to electrolytic baths is even more important in that it is not necessary to recover the fluorinated compounds (an important operation in itself), since the electrolytic baths should contain the aforementioned fluorinated compounds, which can be supplied when adsorbed by the charge of powdered alumina used to fix the fluorinated compounds from the aforementioned electrolytic baths.

In practice, the most effective shown method of effecting the aforementioned basic concept, that is the adsorption of fluorine compounds on powdered alumina, is to use the powdered alumina in the form of a horizontal fluidised bed through which a stream of gas flows by suction up from the electrolytic bath, the thickness of the fluidised bed, the speed of the stream through the bed and consequently the contact time between the bed and the stream being chosen so that the contact time between the gases from the electrolytic bath and the fluidised bed is sufficient to ensure the adsorption of the alumina particles of most of the gaseous fluorine compounds in the aforementioned gases. According to the prior art method, the fine particles of alumina charged with fluorine and the sub-micronic particles of fluorine compounds in the gases coming from the electrolytic bath and entrained above the fluidised bed are subsequently collected in a bag filter disposed above the fluidised bed.

The prior art method, though efficient to a certain extent, has disadvantages which are inherent in the presence of a fluidised bed of alumina particles. These disadvantages include the following:

there is a considerable pressure drop in the stream of gas travelling through the fluidised bed. These pressure drops, which may be several hundred millimetres of water column, represent a considerable consumption of energy;

there is a continuous decrease in efficiency of the fluidised bed between the entry of fresh alumina and the discharge of alumina charged with fluorine, so that the stream of gas through the upstream region of the bed is much more effectively processed than the stream of gas flowing through the downstream portion of the bed; and it is difficult to obtain a fluidised bed of alumina which is homogeneous along the entire length of the bed, since it is impossible to use a conventional porous slab, since the slab would rapidly be obstructed by the powder in the gases for processing. This is an additional cause of the irregular efficiency of a fluidised bed with regard to the stream of gas through it.

SUMMARY OF THE INVENTION

It is the object of the invention to obviate or at least considerably reduce the aforementioned disadvantages.

According to one aspect of the present invention there is provided a method of adsorbing gaseous fluorine from a gas stream which comprises contacting particles of alumina with a stream of gas containing fluorine, usually in the form of fluorinated compounds, the improvement comprising suspending the alumina particles in an adsorption column through which a stream of gas containing fluorine flows upwardly, means being provided for preventing the alumina particles from moving in counter-current by gravity beyond a predetermined threshold and for homogeneously dispersing the particles in the gases for treatment, and thereafter collecting the alumina particles charged with fluorine and any fluorinated compounds which have passed through the adsorption column in the form of fine dust in a separator which delivers a practically pure stream of gas. The gas usually contains the fluorine in the form of fluorine compounds.

It can be seen that, when the aforementioned method is used, the turbulence in the adsorption column and the relatively long contact time between the alumina particles and the stream of gas to be scrubbed favour the extent and the homogeneity of the transfer of fluorine or fluorine compounds from the gaseous phase (the stream for scrubbing) to the solid phase (alumina particles), with a minimum pressure drop.

It is known to use this kind of column in industry for drying or cooling dusty products, that is for providing heat transfer. However, the use of this kind of column for removing fluorine from a gas is revolutionary. It is found by theory and practice that there is an analogy between mass transfer and heat transfer due to turbulent molecular diffusion.

The equations defining the transferred streams are identical for the two types of transfer:

$$\mu_{ms} = H (C_m - C_s)$$

$$\phi \, \theta \, s = h (\Theta_m - \Theta_s)$$

in which;

$C_m$ and $C_s$ represent the average concentration of fluid to be transferred and the concentration of the fluid on the particles, $\Theta_m$ and $\Theta_s$ represent the average temperature of the fluid and the temperature of the particles, and $H$ and $h$ represent the average values of the apparent conductance of transfers in the region of the particles.

The Margoulis criteria representing the transfer efficiency (a dimensionless number) are defined as follows:

Mass Transfer $M_{sm} = (K/\mu)$

Heat Transfer $M_{s\Theta} = (h/\rho C \int \mu_m)$ in which:

$\mu_m$ represents relative average speed of fluid with respect to particles, $C \int$ represents specific heat of fluid, and $\rho$ represents specific weight of fluid.

It has been found by experience that $M_{sm} = M_{s\Theta}$, that is a column designed for heat transfer 13 of comparable efficiency when used for mass transfer under similar physical conditions.

According to the second aspect of the present invention there is provided an apparatus for adsorbing fluorine on fine particles of alumina, which comprises, among other elements, an adsorption column through which the stream of gas for scrubbing flows upwards, means for supplying the adsorption column with fine particles of fresh alumina, means for preventing the fine alumina particles from flowing in counter-current by gravity beyond a predetermined threshold and for homogeneously dispersing the particles into the gas to be processed, and a separator which is disposed downstream of the adsorption column and is capable of collecting the particles of alumina charged with fluorine and any impurities in dust form which have travelled through the adsorption column.

As stated hereinabove, the method according to the invention and the apparatus according to the invention as defined hereinabove may with particular advantage be applied to the scrubbing of gases from electrolytic baths of an aluminum-producing plant, the alumina particles adsorbing the fluorine after which the alumina particles are advantageously fed to the electrolytic baths.

The means for preventing the alumina particles from flowing in counter-current comprise a convergent-divergent (venturi) means provided at the base of the adsorption column, the alumina particles being introduced through, for example, a simple spout at the top edge of the convergent-divergent means.

According to an advantageous embodiment, more particularly in the case of an aluminum-producing plant comprising electrolytic baths, the method according to the invention is performed in such a manner (more particularly with regard to the speed and flow rate of the stream of gas in the adsorption column and the concentration of alumina particles therein) that the particles of alumina leaving the adsorption column and recovered in the separator disposed downstream of the column and the method being continued until a degree of partial saturation is obtained which corresponds to a satisfactory rate of adsorption.

In the case as before of an aluminum-producing plant, the concentration of alumina in the adsorption column is preferably above about 150 g/m³ with the stream of gas having a speed of about 10 to 20 m/sec, so that the gases have a residence time of approximately 1 second. Under these conditions, the pressure drop in the column is only of the order of about 30 to 50 mm of water column.

In the aforementioned alumina recycling method, the apparatus according to the invention, besides comprising the main constituent elements as aforementioned, should also comprise means for recycling at least part of the alumina charged with fluorine into the adsorption column from an alumina recovery station associated with the separator. Preferably, the recycling means are designed so as to permit regulation of the mass flow of recycled alumina.

In the latter case, the system for regulating the mass flow of recycled alumina may advantageously be controlled by detection means sensitive to the presence and the number of alumina particles tending to move by gravity in counter-current beyond a threshold at the base of the adsorption column, the control being such that the mass flow of recycled alumina particles is maintained within a predetermined range.

When the base of the adsorption column is provided with a convergent-divergent means for retaining alumina particles, the aforementioned detection means are preferably disposed in the region of the convergent-divergent means.

The detection means may advantageously be of a conventional photoelectric kind and preferably comprise a number of vertically spaced detection stages, the whole assembly being designed so that the mass flow of recycled alumina varies inversely with the number of the detection stages which are influenced by particles of alumina flowing in counter-current.

The aforementioned controlled detection device may, if required, be designed to operate on the all-or-nothing principle and act as a safety system which cuts off the flow of recycled alumina (and if required gives an alarm signal) if, for any physical reasons, the alumina introduced into the adsorption column crosses the lower limit of the dispersion zone.

Advantageously, the alumina recovery station associated with the separator has a separate system supplying fresh alumina, either during recycling or after the recovery station has been completely emptied after being filled with alumina charged with fluorine.

In the case of an aluminum-producing plant utilising electrolytic baths, a collecting silo serving a number of baths may be directly connected to the fluorinated alumina collecting station so as to supply the baths with alumina. Closure means should be provided for disconnecting or connecting the silo from or to the recovery station.

The invention will be more clearly understood from the following description and the accompanying drawings, both the description and drawings referring to preferred but non-limitative embodiments of the invention.

DESCRIPTION OF THE DRAWINGS

Figure 1:
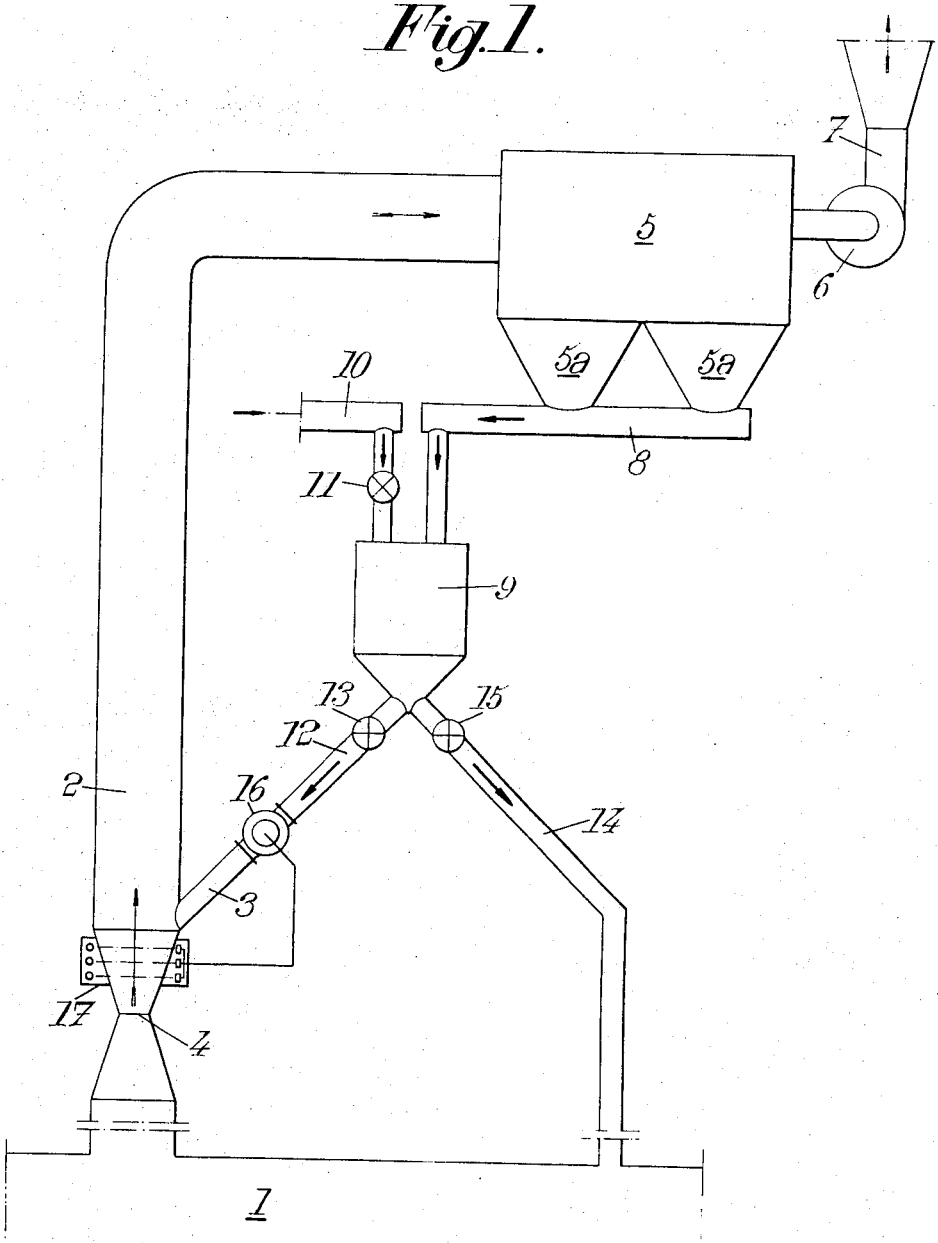
FIG. 1 is a diagram of apparatus according to the invention for adsorbing, on alumina powder, gaseous fluorinated products from electrolytic baths in an industrial aluminum-producing plant and for charging the baths with the powdered alumina when the latter has been suitably saturated with fluorinated products.

The apparatus diagrammatically illustrated in FIG. 1 is designed for an industrial aluminum-producing plant comprising a row of electrolytic baths 1 to be charged with powdered alumina and fluorinated products (inter alia, cryolite and aluminum fluoride).

The apparatus accoridng to the invention should be capable of purifying the stream of gas from baths 1 of most of the fluorine which it entrains, the fluorine being adsorbed on alumina which, when sufficiently charged with fluorine, is fed to baths 1.

The apparatus illustrated comprises an adsorption column 2 through which a stream of gas for scrubbing from baths 1 flows upwards, unsaturated powdered alumina being supplied to the base of column 2 via a spout 3 entering the upper edge of a convergent-divergent means 4 designed to produce flow conditions opposing the fall of alumina particles in counter-current.

The top of column 2 is connected to a separator 5 comprising a filter-cloth filter and also comprising bottom hoppers 5a in which 80 to 85 percent of the largest alumina particles are directly deposited by inertia or decantation, whereas the finer particles are collected on filter cloth which is periodically cleaned by vibration and/or by a counter-current flow.

The cleaning cycle may last approximately 10 to 15 minutes depending on the porosity of the filtering medium and the pressure drops which are acceptable.

The stream charged with particles is kept flowing through column 2 and separator 5 by a fan 6 which is disposed downstream of the filter and which discharges a stream of scrubbed gas through a chimney 7.

Alumina which has been partly charged with fluorine recovered in hoppers 5a is at least partly recycled to column 2 until its fluorine content is compatible with its adsorption capacity and corresponds to the desired content in fluorinated products for feeding to bath 1. (The fluorine content is usually from 0.5 to 3 percent depending on the porosity of the powdered alumina used.)

In order to recycle the alumina, the hoppers 5a are served by a conveyor 8 which may, for example, comprise an Archimedean screw or aero-slideways and a porous slab, and which supplies an intermediate hopper 9 into which fresh alumina can be directly introduced through a supply duct 10 equipped with a valve 11. The bottom of hopper 9 can be connected to the spout 3 supplying column 2 via an evacuation duct 12 equipped with a valve 13, or may be connected to a silo supplying baths 1 via an evacuation duct 14 equipped with a valve 15.

The flow rate of recycled alumina may be regulated, for example, by a rotating lock or sluice 16 provided on duct 12 upstream of spout 3, lock 16 being controlled, while rotating, by a photoelectric detector 17 having a number of levels which are sensitive to the presence of alumina particles and are spaced round the divergent portion of the convergent-divergent means 4 below the place where the spout 3 enters column 2.

The aforementioned installation can replenish the supply of alumina, either by introducing fractions of fresh alumina into the intermediate hopper 9 via supply duct 10 after evacuating some of the alumina charged with fluorine through evacuation duct 14 into baths 1, or by completely emptying the intermediate hopper 9 via duct 14 and filling it with fresh alumina via duct 10.

The use of an intermediate hopper containing only a portion of the total charge intended for the electrolytic baths, and the recycling of the aforementioned portion followed by fractional replensihment or in a single operation, appear to correspond most closely to the operating conditions of an industrial aluminum-producing plant.

In a plant of the aforementioned kind, the flow rate of gas from the electrolytic baths is of the order of about 170,000 to 180,000 $m^3$ per ton of aluminum produced. If all the powdered alumina for supplying the electrolytic baths were used in the gas scrubbing circuit in a single pass and without recycling, the resulting content of the solid phase would be only about 11 to 12 $g/m^3$, that is much lower than the content required to ensure efficient operation of the adsorption column 2 (that is a total dust content of the order of about 150 to 600 $g/m^3$).

In order to maintain the last-mentioned content, it is practically essential to recycle the used alumina and subsequently to replenish fractions of fresh alumina of the order of 2 to 5 percent of the quantity of alumina in service in column 2.

Under the aforementioned conditions, the alumina will be quite capable of adsorbing fluorine in the proposed manner, allowing for the quantities of fluorine liberated in the electrolytic baths.

It is usually estimated that the production of 1 ton of aluminum requires about 2 tons of alumina and results in the liberation of about 20 kg of fluorine, about 50 to 60 percent of which is in the form of gas and about 50 to 40 percent of which is in dust form. If all the fluorine were retained on the alumina used, the final charge of fluorine on the alumina would be of the order of 1 percent including 0.5 to 0.7 percent of gaseous fluorine fixed by adsorption. This content can easily be obtained with alumina of average porosity and is well below the saturation limit.

Accordingly, when the method and apparatus for collecting fluorine according to the invention was applied to commercial alumina of high porosity (for example, of the order of about 20 to 30 $m^2$ per gram) the total fluorine recovery rate was above 98 percent and the total content of fluorine in the alumina at the end of the operation was of the order of 3 percent, including approximately 1 percent in solid form, corresponding to an excellent recovery yield, the content of fluorine in the alumina being far below the saturation rate.

Figure 2:
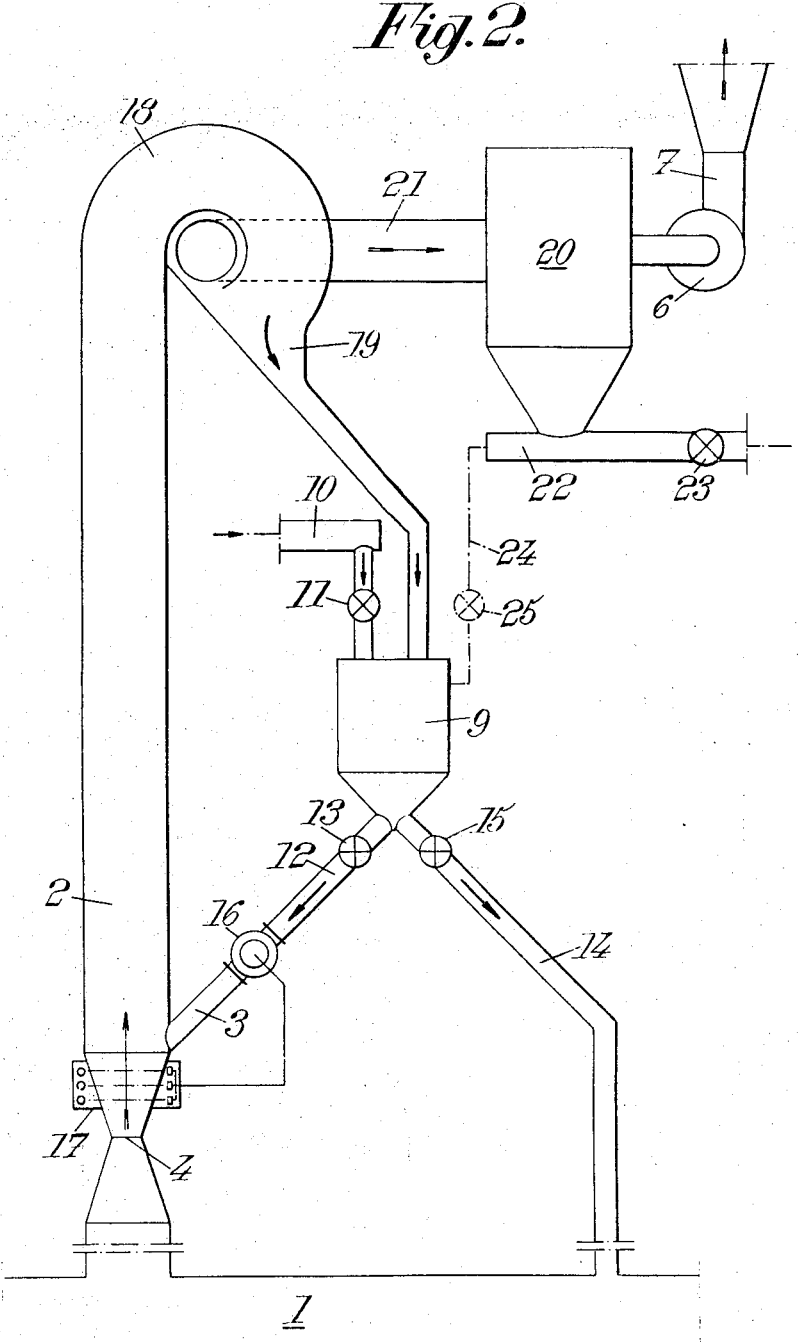
FIG. 2 is a diagram illustrating another embodiment according to the invention of the aforementioned apparatus associated with an industrial aluminum-producing plant.

A second embodiment of the invention will now be described, being a variant of the first embodiment, with reference to FIG. 2 in which like reference numbers indicate elements corresponding to FIG. 1.

The second embodiment differs from the first in that the separate of solid particles in suspension in the stream of gas from the adsorption column occurs in two successive steps, the first corresponding to the collection of relatively large alumina particles (of the order of about 20 to 30 microns) and the second step corresponding to the collection of fine dust remaining in suspension in the stream of gas after the first step, the fine dust consisting inter alia of alumina and impurities from the electrolytic baths.

Incidentally, the second embodiment is important in cases when the electrolytic baths produce appreciable quantities of impurities in the form of fine dust which are liable to impair the properties of the aluminum produced if recycled to the baths. This is because, during the second step, the second embodiment can be used to isolate the fine dust, including harmful impurities, remove it from the main flow and, if required, subject it to special further purification for the purpose of recovery.

The apparatus for the first separation comprises a conventional cyclone or a special axially horizontal cyclone 18 which is disposed at the top of column 2 and which feeds hopper 9 with relatively large alumina particles via its peripheral collector 19. The apparatus for the second separation comprises a filter-cloth separator 20 supplied with fine dust via a duct 21 from the central collector of cyclone 18, the separator supplying fine dust to a conveyor 22 connected by a valve 23 to an evacuation or scrubbing station.

It there are no fine-dust impurities, the yield of the installation may advantageously be improved by providing a direct connection between conveyor 22 and hopper 19. The direct connection, which is shown by a broken line in FIG. 2, comprises a pipe 24 equipped with a valve 25 which is open (valve 23 being closed) in the aforementioned favourable case in which there are no impurities.

Clearly, and as the preceding shows, the invention is in no way limited to those of its applications or those embodiments of its various parts which have been described in detail, but includes all variants.

I claim:

1. In a method of adsorbing gaseous fluorine from a gas stream, which comprises contacting particles of alumina with a stream of gas containing fluorine, usually in the form of fluorinated compounds, the improvement comprising suspending the alumina particles in an adsorption column through which a stream of gas containing fluorine flows upwardly from an inlet at the base to an outlet at the top by introducing alumina particles at the base of the column in and just above the inlet having a convergent portion leading into the inlet and a divergent portion leading out of the inlet into the base of the column thereby to establish turbulence in the adsorption column with a relatively long contact time between the alumina particles and the stream of gas preventing the alumina particles from moving in counter-current by gravity beyond a predetermined threshold and homogeneously dispersing the particles in the gases for treatment, maintaining gaseous flow at a rate whereby the particles ultimately find their way upwardly through the column for passage through the outlet at the top, and thereafter collecting the alumina particles charged with fluorine and any fluorinated compounds which have passed through the adsorption column in the form of fine dust in a separator which delivers a practically pure stream of gas.

2. A method as claimed in claim 1, in which the alumina particles leaving the adsorption column and recovered in the separator are not saturated with fluorine and are recycled to the adsorption column.

3. A method as claimed in claim 1, in which the concentration of alumina in the adsorption column is above about 150 g/m$^3$.

4. A method according to claim 1, in which the speed at which the stream of gas rises in the adsorption column is between about 10 and about 20 m/sec.

5. A method according to claim 1, in which the separation of the solid particles in suspension in the stream of gas from the adsorption column is performed in two successive stages, the first corresponding to the collection of relatively large alumina particles and the second corresponding to the collection of fine dust remaining suspended in the stream of gas leaving the first stage.

6. A method according to claim 1, wherein the pressure drop in the adsorption column is only of the order of about 30 to 50 mm of water column.

7. A method according to claim 1, including replenishing a fraction of fresh alumina into the column.

8. A method according to claim 7, wherein said fraction of fresh alumina is at least of the order of 2 percent of the quantity of alumina in service in the column.

9. A method according to claim 7, wherein said fraction of fresh alumina is of the order of 2 to 5 percent of the quantity of alumina in service in the column.

10. A method according to claim 1, wherein said distributing of alumina particles is in an at least partially downward direction.

* * * * *